(12) United States Patent
Ware

(10) Patent No.: US 11,080,185 B2
(45) Date of Patent: Aug. 3, 2021

(54) HYBRID MEMORY MODULE

(71) Applicant: Rambus Inc., Sunnyvale, CA (US)

(72) Inventor: Frederick A. Ware, Los Altos Hills, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 16/618,105

(22) PCT Filed: May 15, 2018

(86) PCT No.: PCT/US2018/032674
§ 371 (c)(1),
(2) Date: Nov. 27, 2019

(87) PCT Pub. No.: WO2018/231408
PCT Pub. Date: Dec. 20, 2018

(65) Prior Publication Data
US 2021/0042226 A1    Feb. 11, 2021

Related U.S. Application Data

(60) Provisional application No. 62/520,065, filed on Jun. 15, 2017.

(51) Int. Cl.
*G06F 12/00* (2006.01)
*G06F 12/0802* (2016.01)

(52) U.S. Cl.
CPC .. *G06F 12/0802* (2013.01); *G06F 2212/7203* (2013.01)

(58) Field of Classification Search
CPC ............ G06F 12/0802; G06F 12/0238; G06F 12/0246; G06F 2212/7203
See application file for complete search history.

(56) References Cited

U.S. PATENT DOCUMENTS

| | | | |
|---|---|---|---|
| 5,133,060 A * | 7/1992 | Weber ................. | G06F 12/0866 711/113 |
| 5,586,291 A * | 12/1996 | Lasker ................ | G06F 11/1435 711/113 |
| 5,651,135 A | 7/1997 | Hatakeyama | |
| 5,675,765 A | 10/1997 | Malamy et al. | |
| 5,781,926 A | 7/1998 | Gaskins et al. | |
| 5,809,562 A | 9/1998 | Gaskins et al. | |
| 5,835,929 A | 11/1998 | Gaskins et al. | |
| 5,875,451 A | 2/1999 | JoSeph | |
| 6,212,602 B1 | 4/2001 | Wicki et al. | |

(Continued)

OTHER PUBLICATIONS

Cheng-Chieh Huang et al., "ATCache: Reducing DRAM Cache Latency via a Small SRAM Tag Cache", 2014, Proceedings of the 23rd International Conference on Parallel Architectures and Compilation Techniques, pp. 51-60 (Year: 2014).*

(Continued)

*Primary Examiner* — Shawn X Gu
(74) *Attorney, Agent, or Firm* — Silicon Edge Law Group LLP; Arthur J. Behiel

(57) ABSTRACT

A hybrid memory module includes cache of relatively fast and durable dynamic, random-access memory (DRAM) in service of a larger amount of relatively slow and wear-sensitive flash memory. An address buffer on the module maintains a static, random-access memory (SRAM) cache of addresses for data cached in DRAM.

19 Claims, 10 Drawing Sheets

(56) References Cited

U.S. PATENT DOCUMENTS

| | | | |
|---|---|---|---|
| 6,412,044 | B1 | 6/2002 | Kung |
| 6,449,694 | B1 | 9/2002 | Burgess, Jr. et al. |
| 6,654,854 | B1 | 11/2003 | Janakiraman et al. |
| 6,839,806 | B2 | 1/2005 | Murakami et al. |
| 6,865,646 | B2 | 3/2005 | David |
| 9,262,318 | B1* | 2/2016 | Vadlamani .......... G06F 12/0871 |
| 2003/0007537 | A1* | 1/2003 | Pang ................ H01S 3/027 372/59 |
| 2003/0074537 | A1 | 4/2003 | Pang et al. |
| 2008/0024192 | A1* | 1/2008 | Kase .................. H03K 17/6871 327/407 |
| 2008/0244192 | A1 | 10/2008 | Uchiyama |
| 2010/0077136 | A1* | 3/2010 | Ware .................. G06F 12/0804 711/103 |
| 2013/0138892 | A1 | 5/2013 | Loh et al. |
| 2014/0351498 | A1* | 11/2014 | Hsueh ................ G06F 12/0284 711/103 |
| 2017/0060434 | A1 | 3/2017 | Chang et al. |

OTHER PUBLICATIONS

Notification of Transmittal of the International Search Report and the Written Opinion of the International Searching Authority, or the Declaration dated Jul. 30, 2018 re: Int'l Appln. No. PCT/US2018/032674. 9 Pages.

Wikipedia, "CPU cache", downloaded May 29, 2017 from https://en.wikipedia.org/wiki/CPU_cache. Page last edited May 20, 2017. 16 Pages.

EP Extended European Search Report dated Feb. 18, 2021 re: EP Appln. No. 18818109.3. 10 pages.

Huang, Cheng-Chieh et. al., "ATCache: Reducing DRAM Cache Latency via a Small SRAM Tag Cache", Proceedings of the 23rd International Conference on Parallel Architectures and Compilation Techniques, Aug. 24-27, 2014, Edmonton, AB, Canada, ACM, 2 Peen Plaza, Suite 701, New York, NY, 10121-0701 USA, XP058054090, DOI: 10.1145/2628071.2628089, ISBN: 978-1-4503-2809-8, 10 pages.

* cited by examiner

HYBRID MEMORY MODULE

FIELD OF THE INVENTION

The disclosed embodiments relate generally to memory systems, components, and methods.

BRIEF DESCRIPTION OF THE DRAWINGS

The detailed description is illustrated by way of example, and not by way of limitation, in the figures of the accompanying drawings and in which like reference numerals refer to similar elements and in which.

DETAILED DESCRIPTION

A hybrid memory module employs relatively fast, durable, and expensive dynamic, random-access memory (DRAM) components to cache a subset of data stored in a larger amount of relatively slow, wear-sensitive, and inexpensive nonvolatile memory. The DRAM components store the subset of data in association with address tags that map to addresses in the nonvolatile memory. An address buffer component on the memory module caches a subset of the address tags in a static random-access memory (SRAM). Together, the DRAM and SRAM caches hasten read and write access and reduce wear for a larger amount of nonvolatile memory. The address buffer component also manages communication between the DRAM cache and the nonvolatile memory to accommodate disparate access granularities, reduce the requisite number of memory transactions, and minimize the flow of data to and from nonvolatile memory. The memory module thus combines the nonvolatility and reduced per-bit price of nonvolatile memory with the speed and durability of DRAM.

Figure 1A:
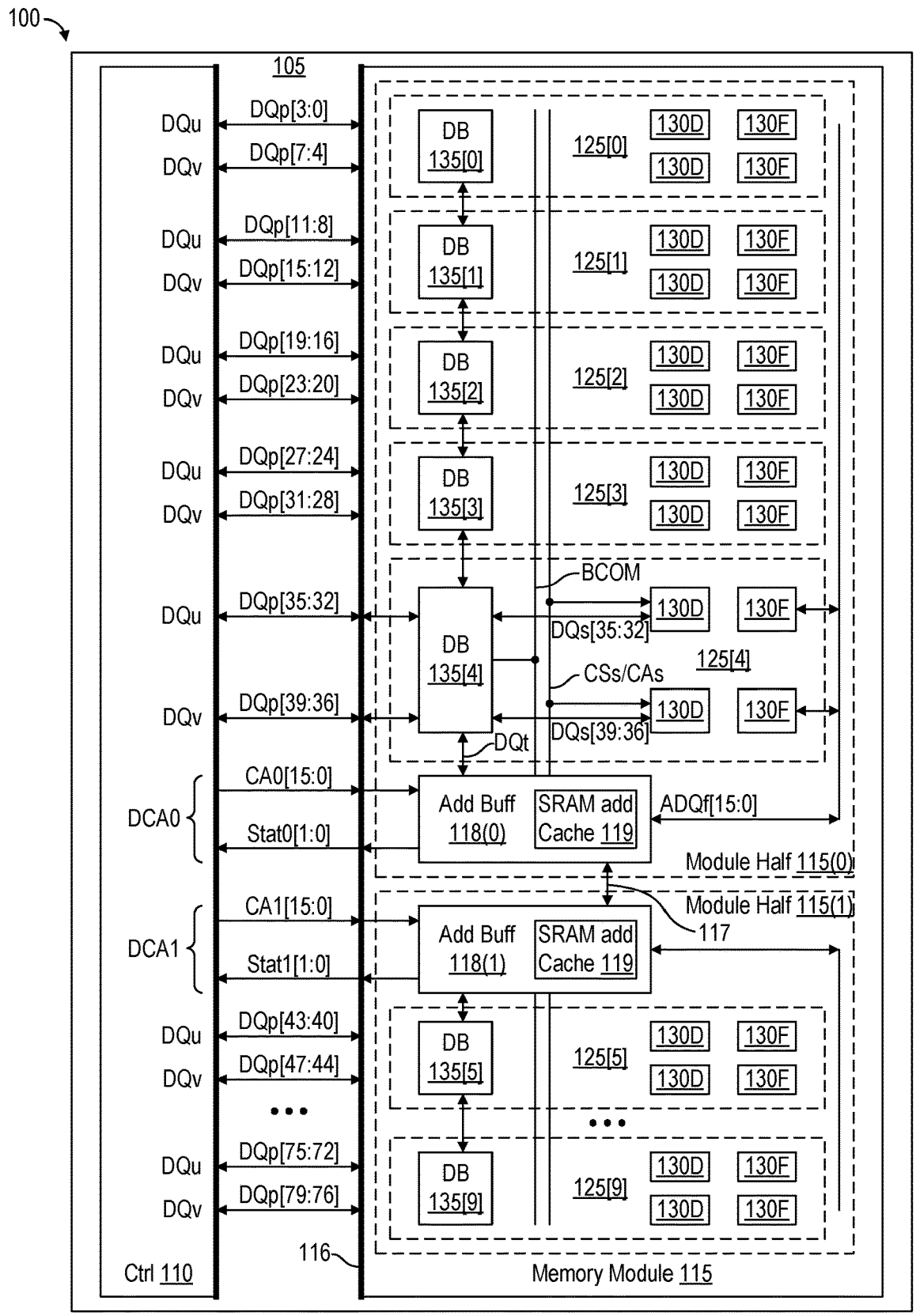
FIG. 1A depicts a memory system 100 in which a motherboard 105 supports a memory controller 110 that communicates with a hybrid memory module 115.

FIG. 1A depicts a memory system 100 in which a motherboard 105 supports a memory controller 110 that communicates with a hybrid memory module 115 via twenty pairs of nibble-wide (four-bit, or x4) primary data ports DQu/DQv and two primary command-and-address (CA) ports DCA0 and DCA1. Memory module 115 is logically divided into two module halves 115(0) and 115(1) that can be controlled separately or together to communicate either forty-bit or eighty-bit data over a module connector 116. Halves 115(0) and 115(1) are identical for purposes of this disclosure; the following discussion focusses on low-order module half 115(0). Links 117 between module halves 115(0) and 115(1) allow both to respond to the same commands in the eighty-bit mode.

Module half 115(0) includes a local address buffer 118(0), sometimes referred to as a register or registering clock driver (RCD), or a module controller. Address buffer 118(0) is an integrated-circuit (IC) component that manages five memory slices 125[4:0] at the direction of external controller 110. Address buffer 118(0) is a sophisticated local controller that manages read and write accesses using a multi-set SRAM address cache 119 to hasten cache hit and miss decisions, and thus improve speed performance.

Each slice 125[4:0] includes two nonvolatile memory components 130F, two DRAM components 130D, and a data-buffer (DB) component 135. Memory components 130F are NAND flash components, but other types nonvolatile memory can be used. DRAM components 130D collectively have e.g. one one-sixteenth ($\frac{1}{16}^{th}$) the storage capacity of flash components 130F. Among other tasks, each DB component 135 works with address buffer 118(0) to manage the flow of data between DRAM components 130D of the same slice and flash components 130F from the same or different slices. The following discussion focuses on memory slice 125[4], the slice in module half 115(0) closest to address buffer 118(0). The remaining slices 125[3:0] are essentially identical. DRAM and flash memories can be arranged differently in other embodiments. Where DRAM components 130D are organized in slices, for example, it could be that flash components 130F are separate from all or a subset of these slices. For example, only every other slice with one or more DRAM component might also include flash memory.

Address buffer 118(0) receives commands from external controller 110 via links CA0[15:0] and returns status information via links Stat0[1:0]. Address buffer 118(0) also controls: DB components 135[4:0] via a local communication bus BCOM; DRAM components 130D via a DRAM control bus CSs/CAs (for chip-select/command, and address); and flash components 130F via a flash data and control bus ADQf. In one embodiment, bus ADQf conforms to an interface specification known as ONFI, for "Open NAND Flash Interface." Other embodiments can use different interfaces and different types of volatile and nonvolatile memory.

Remaining focused on slice 125[4], DB component 135[4] communicates with controller 110 via eight primary data links DQp[39:32] and with DRAM components 130D via a corresponding eight secondary data links DQs[39:32]. Read and write memory accesses are accomplished in sixteen-bit bursts, so DB component 135[4] communicates 128 bits (4×2×16b=128b) for each memory access, and the five slices 125[4:0] of module half 115(0) communicate a cumulative 640 bits (5×128b=640b) with external controller 110. Using ten-bit bytes, module half 115(0) thus exhibits an access granularity of sixty-four bytes (64B). DRAM components 130D are collectively employed as cache memory, and the data sets transferred between DRAM components 130D memory and either controller 110 or flash components 130F are termed "cache lines." Each cache line provides 64B of data, and can include additional bits for e.g. error-detection and correction (EDC), parity, and various cache-related functions. An embodiment that uses 80B cache lines to store 64B data and related information is detailed below in connection with FIGS. 4A and 4B.

External controller 110 issues read commands that request information from specific addresses in flash components 130F. If requested data is cached in DRAM components 130D, then address buffer 118(0) manages the delivery of that cache line from a rank of ten DRAM components 130D via five DB components 135[4:0]. In this context, a "rank" refers to a set of components that address buffer 118(0) accesses (read or write) responsive to a host-side memory request. Each DRAM component 130D has a data width of four bits, so module half 115(0) has a rank width of forty bits.

If the requested data is not in cache—a so-called cache miss—address buffer 118(0) reads the requested data from one or more of flash components 130F via local bus ADQf and distributes the requested cache line evenly across all ten DRAM components 130D of module half 115(0). A local bidirectional or paired unidirectional daisy-chain data bus DQt provides point-to-point connections between address buffer 118(0) and each slice 125[4:0]. Caching a subset of each cache line in each DRAM component 130D supports parallel, high-speed read and write access for host controller 110. Storing complete flash cache lines in individual flash components 130F facilitates fast and efficient cache write-back and garbage-collection processes.

Figure 1B:
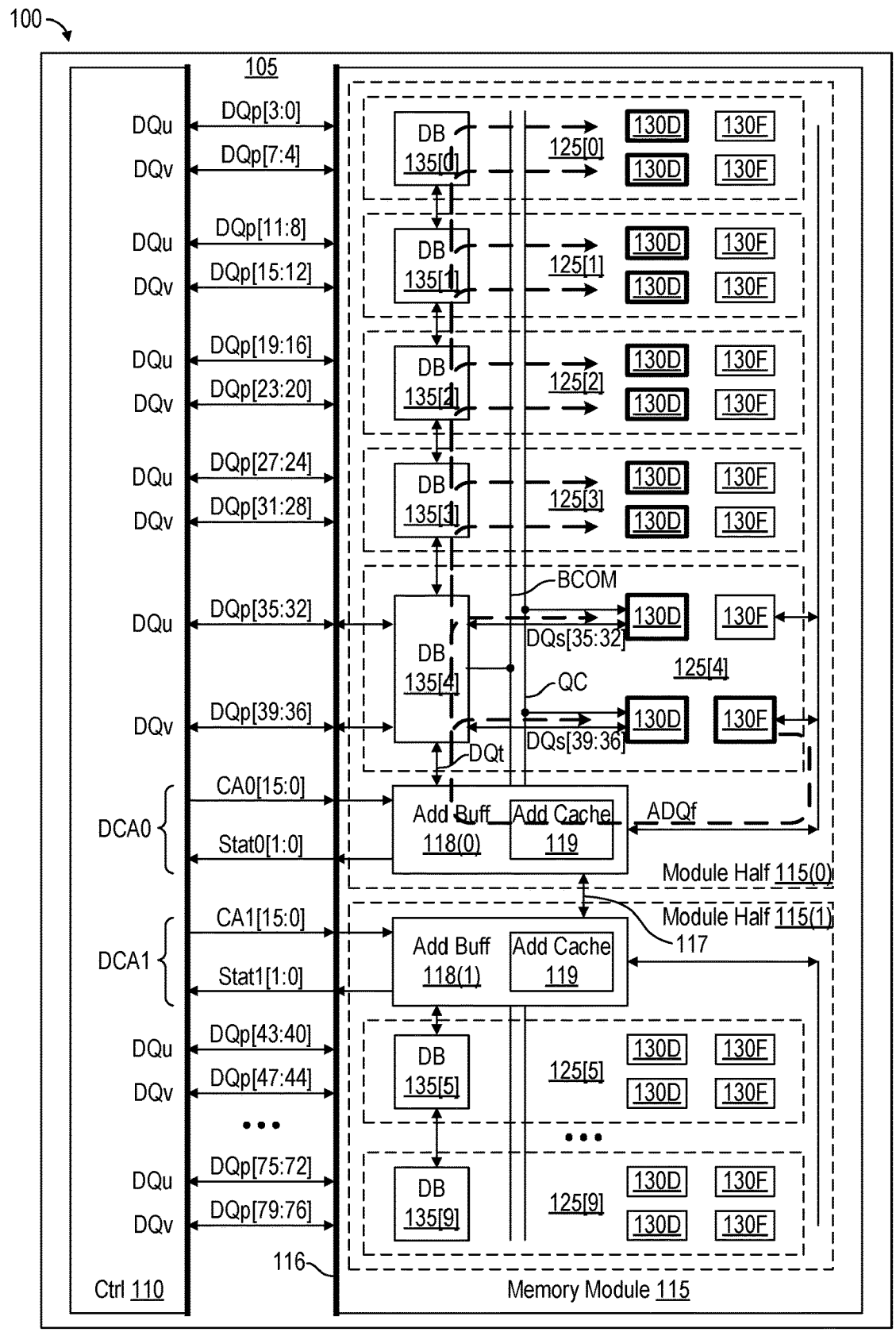
FIG. 1B depicts memory system 100 of FIG. 1A, but includes bold, dashed arrows to illustrate how a 64B cache line of data is distributed from a single flash component 130F to a rank of ten similarly highlighted DRAM components 130D.

FIG. 1B depicts memory system 100 of FIG. 1A, but includes bold, dashed arrows to illustrate how a 64B or 80B cache line of data is distributed from a single flash component 130F—highlighted using bold boundaries—to a rank of ten similarly highlighted DRAM components 130D. In a wide mode, module 115 supports ranks of twenty DRAM components 130D; links 117 between address buffers 118(0) and 118(1) allow cache lines from one or more flash components 130F to be distributed across all twenty DRAM components 130D.

Figure 2:
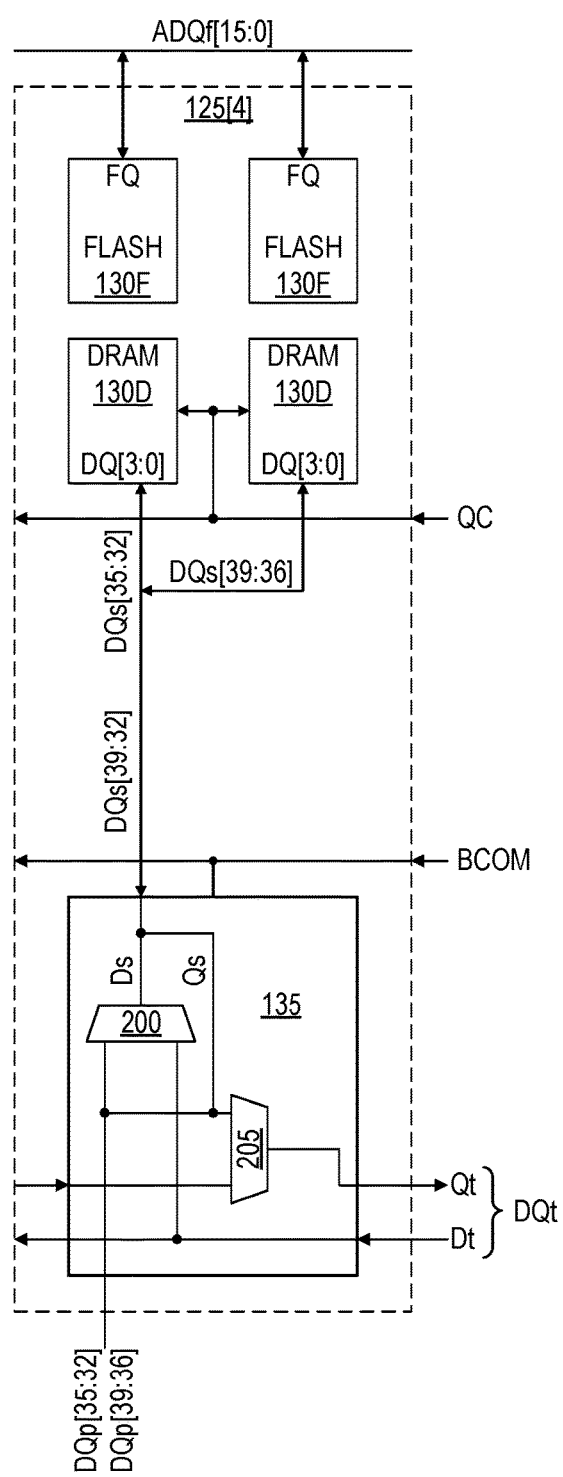
FIG. 2 depicts memory slice 125[4] of FIGS. 1A and 1B in accordance with one embodiment.
Figure 2:
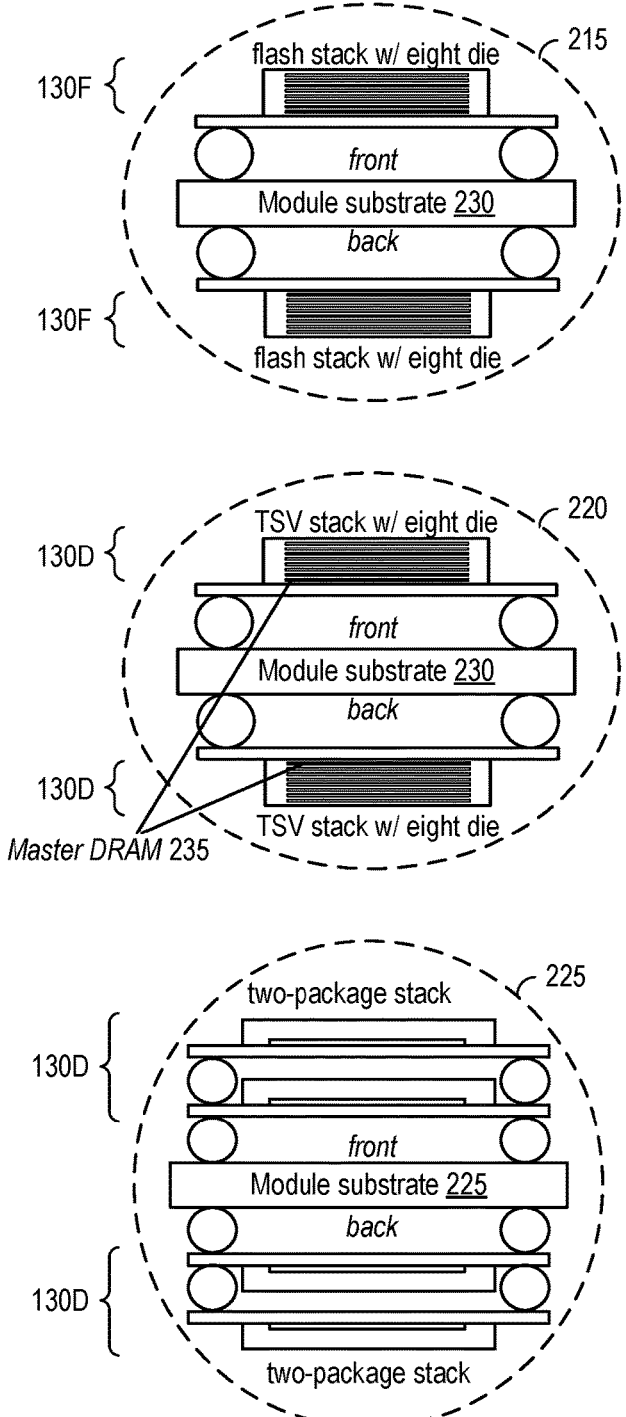

FIG. 2 depicts memory slice 125[4] of FIGS. 1A and 1B in accordance with one embodiment. Each of DRAM components 130D includes a DRAM-component interface DQ[3:0] supporting a four-bit data width (the "volatile data width") connected to data-buffer component 135 via a respective one of the two secondary data link groups DQs[35:32] and DQs[39:36]. Each of flash components 130F includes a flash-component interface FQ connected to address buffer 118(0) (FIGS. 1A and 1B) via multi-drop bus ADQf[15:0]. Component interfaces FQ and bus ADQf each support a sixteen-bit data width (the "nonvolatile data width"). Steering logic 200 and 205 allow DRAM components 130D to communicate data with controller 110, via primary data links DQp[39:32], or with flash components 130F via local bus DQt. Steering logic 205 and links DQt through DB component 135 additionally allow slice 125[4] to communicate data between address buffer 118(0) and neighboring slices 125[3:0]. This functionality is detailed below in connection with FIG. 3.

FIG. 2 additionally shows a packaging option 215 for flash components 130F and alternative packaging options 220 and 225 for DRAM components 130D. Flash packaging option 215 includes two stacks of eight flash devices, or "dies," interconnected by e.g. through-silicon vias (TSVs). Flash components 130F are on either side of module substrate 230 in this example. DRAM packaging option 220 includes two stacks of eight DRAM dies interconnected by e.g. TSVs. Address buffer 118(0) thus selects a rank of DRAM dies, one from each DRAM component 130D, for each memory access. Each DRAM stack includes a master die 235 with data-buffer logic. In packaging option 225, DRAM components 130D are two-package stacks, one package on either side of module substrate 230. DRAM components 130D serve as cache storage for up to e.g. one sixteenth of the storage space afforded by flash components 130F. Other alternative arrangements with the same or different numbers of DRAM or nonvolatile memory dies or packages can also be used.

Figure 3:
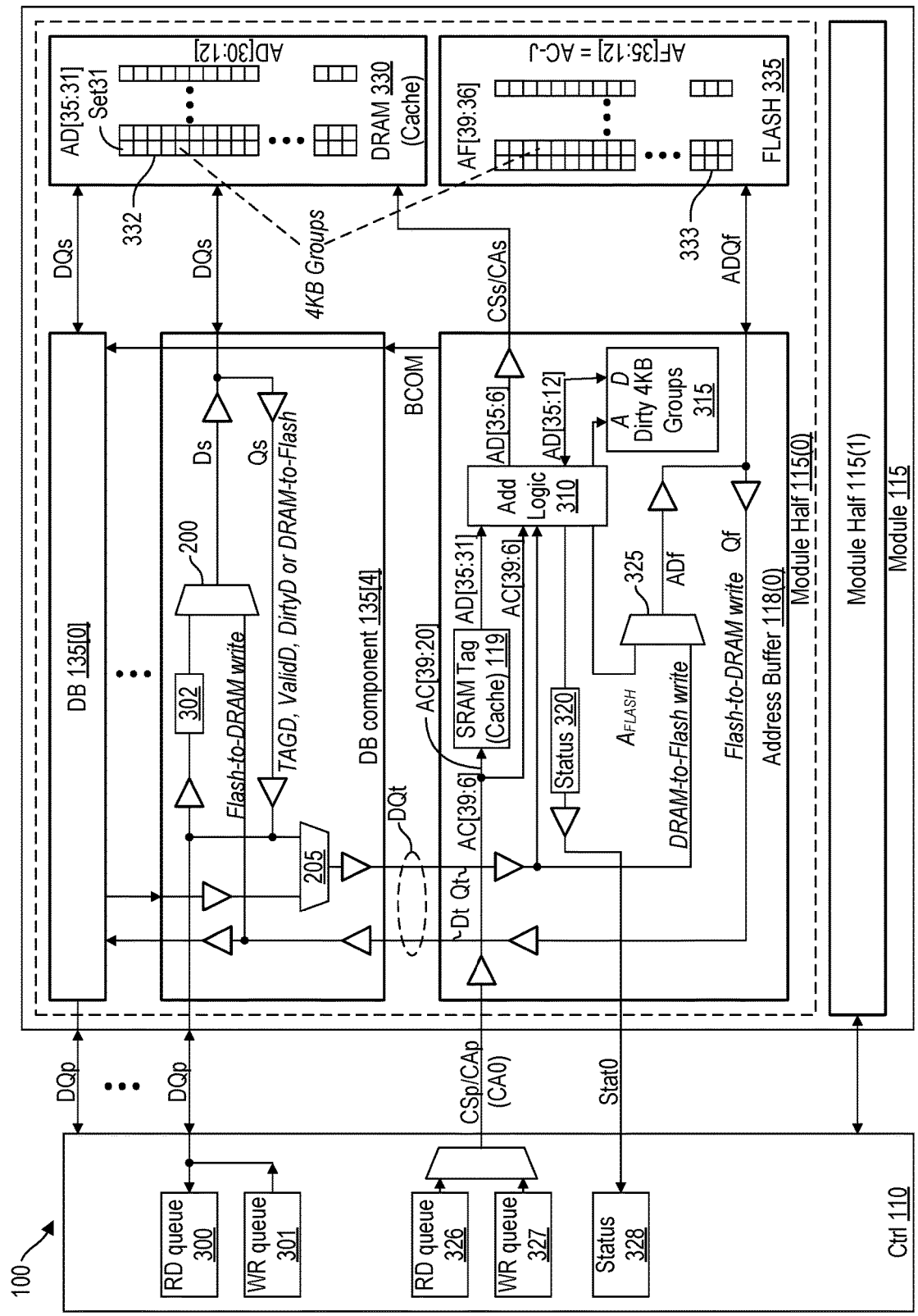
FIG. 3 depicts memory system 100 of FIG. 1 in a manner that emphasizes functional aspects of low-order module half 115(0).

FIG. 3 depicts memory system 100 of FIG. 1 in a manner that emphasizes functional aspects of low-order module half 115(0). DB component 135[4] and address buffer 118(0) include numerous triangles suggestive of buffers and included to highlight the directions of information flow. Selection and placement of signal buffers, and the routing of signals in general, is within the ability of those of skill in the art. At the direction of address buffer 118(0) via local communication bus BCOM, each DB component 135 communicates with memory controller 110 via eight primary data links DQp, delivering read data to a read queue 300 and receiving write data from a write queue 301 into a data buffer 302. Queues 300 and 301 and the other elements of controller 110 are conventional so a detailed discussion is omitted.

Address buffer 118(0) manages the flow of data to and from DRAM cache 330 responsive to commands and addresses from read and write queues 326 and 327 of controller 110 and passes status information back to a status register 328 in controller 110. Address buffer 118(0) additionally maintains coherence between SRAM address cache 119, DRAM cache 330, and flash address space 335.

The ten DRAM components 130D of module half 115(0) that were introduced in connection with FIG. 1A are depicted collectively as DRAM address space 330, which is logically divided into thirty-two sets Set[31:0] of 4 KB groups 332. Each of sets Set[31:0] includes 524 KB in 4 KB groups 332 for a total available DRAM address space of 64 GB for storing data. The ten flash components 130F of module half 115(0) are depicted collectively as an array of 4 KB groups 333 in flash address space 335. Flash address space 335 stores sixteen times as many cache lines as DRAM space 330 so flash addresses are specified using four more bits than DRAM address space 330 (AF[39:30] vs. AD[35:30]). Each of nonvolatile 4 KB groups 333 includes sixty-four 64B cache lines. The total available flash memory space is $2^{40}$ bytes, or 1 TB. Any 4 KB group 333 in flash address space 335 can have a corresponding 4 KB group 332 in DRAM address space 330.

The control logic in address buffer 118(0) can manage an arbitrary number of sets cached in DRAM 330, depending in part upon how much space is reserved for data. Embedding the cache tags in the "extra" part of the 80B cache lines allows the total amount of DRAM cache space to be other than a power of two. This flexibility is useful if e.g. some DRAM address space is to be set aside for buffer space (e.g. for write aggregation) or for address mapping tables (e.g. between flash address space to the physical memory space).

The size of each cache set can be an even divisor of the physical address space; both SRAM and DRAM caches will typically support a power-of-two number of cache lines. In some embodiments the Flash address space may be larger than the physical memory, leaving extra nonvolatile storage for e.g. managing erase block rotation.

In some embodiments a portion of DRAM address space 330 is used to aggregate the write-back of dirty pages to flash address space 335. Dirty pages are moved from DRAM sets Set[31:0] to a write-back region to await a write-back process. Aggregating write-back operations improves speed performance because moving a 4 KB page within DRAM address space 330 takes only a few hundred nanoseconds, whereas a program operation to write to flash address space 335 takes tens of microseconds. Write-back aggregation can take advantage of the fact that DRAM address space 330 can support a non-power-of-two number of sets even if the physical memory space it caches is a power of two, and each set has a power-of-two number of cache lines. DRAM address space 330 can also be used for address mapping between DRAM and flash addresses for e.g. page rotation in support of wear leveling.

Address buffer 118(0) includes address-mapping logic 310, a dirty-group buffer 315, status logic 320, and data/address selection logic 325. Mapping logic 310 combines address bits from SRAM address cache 119 and controller addresses AC[39:6] to provide DRAM addresses for DRAM cache 330 and dirty-group buffer 315, and additionally supports control signaling for DRAM and buffer read and write access. Each time address-mapping logic 310 writes to a given 64B cache line, address-mapping logic 310 additionally writes in buffer 315 the address of the 4 KB group 332 encompassing the 64B, with address A being a buffer entry address and address D address bits AD[35:12] specifying the address field of a dirty group in DRAM address space 330. Buffer 315 thus maintains a list of blocks 332 that include at least one dirty cache line. The aggregation of entries in buffer 315 is later used to write dirty bits into DRAM cache 330 at the first cache line address in each dirty 4 KB group. Dirty-bit updates from buffer 315 to DRAM cache 330 can be performed during idle times or otherwise interleaved with memory transactions to limit interference. As detailed below, these group-level dirty bits allow address buffer 118(0) to quickly find clean 4 KB groups to evict in favor of 4 KB flash groups.

Figure 4A:
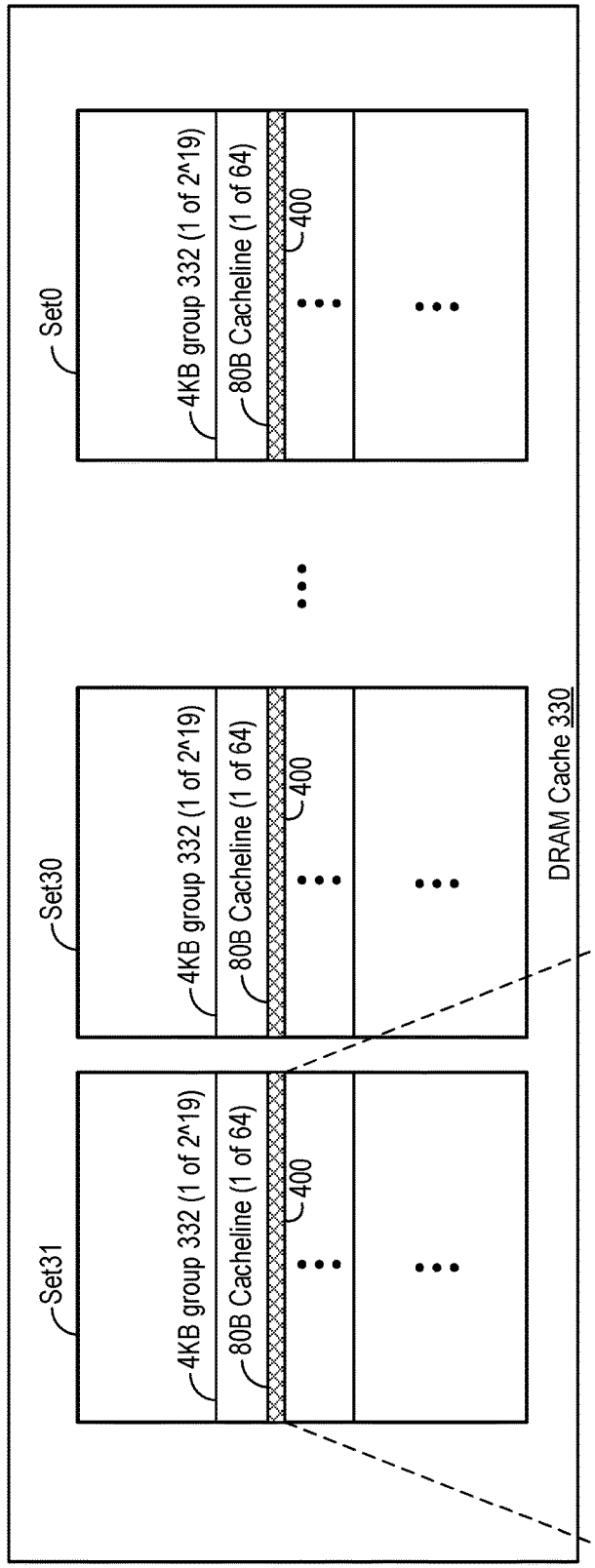
FIG. 4A illustrates DRAM cache 330 of FIG. 3, which includes thirty-two sets Set[31:0] of eighty-byte (80B) cache lines 400 divided into 2^19 4 KB groups.

FIG. 4A illustrates DRAM cache 330 of FIG. 3, which includes thirty-two sets Set[31:0] of eighty-byte (80B) cache lines 400 divided into 2^19 4 KB groups. Each cache line 400 includes five fields, a 64B data field to store cached data; a parity-bit field P to store a parity bit; a valid-bit field V, dirty-bit D, and DRAM tag field TagD in support of caching; and an EDC field to store error-correction and detection (EDC) bits.

Controller 110 and/or an associated processor has access to lower-level caches that manage reads and writes of 64B cache lines. SRAM address cache 119 and DRAM cache 330 expand cache locality to 4 KB to increase hit rates for cache lines outside the lower level caches. Assuming a paging system with 4 KB granularity, access to a 64B cache line within a given 4 KB provides a strong likelihood of subsequent accesses to other cache lines within the same page. Different 4 KB pages can belong to different processes so cache locality tends not to extend beyond a page. The sizes of the cache lines and cached blocks can be different in other embodiments.

Figure 4B:
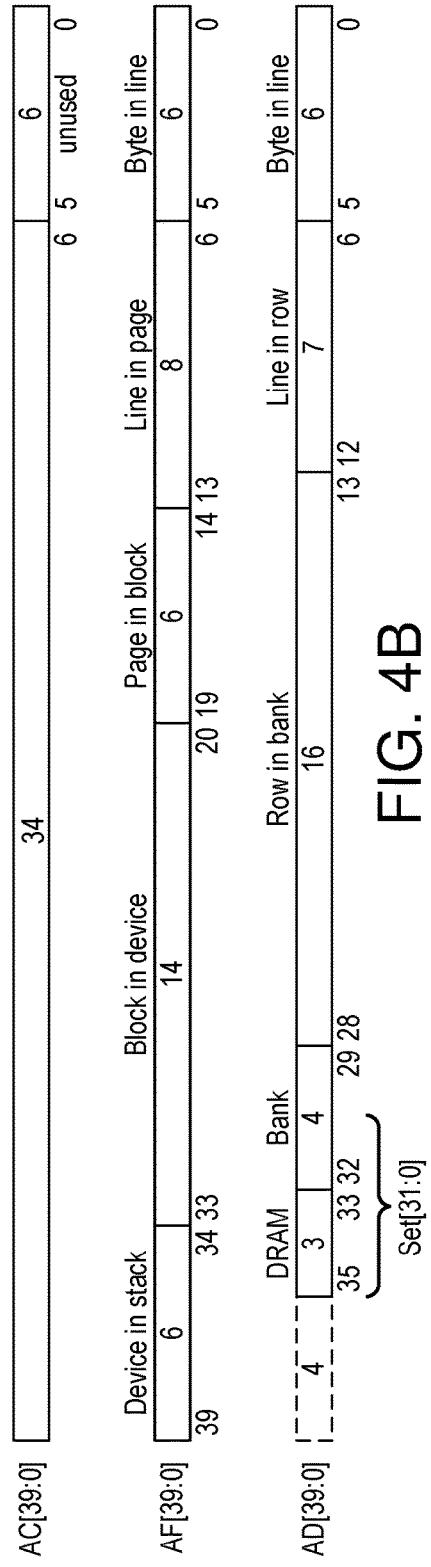
FIG. 4B illustrates how 64B cache lines in flash memory space 335 of FIG. 3 map to 80B cache lines 400 in DRAM memory space 330 in accordance with one embodiment.

FIG. 4B illustrates how 64B cache lines in flash memory space 335 of FIG. 3 map to 80B cache lines 400 in DRAM memory space 330 in accordance with one embodiment. Controller addresses AC[39:0] specify 2^40 individual data bytes (1 TB). Module 115 delivers 64B cache lines so the six least-significant bits AC[5:0] are not used. The flash addressing accommodates up to sixty-four (2^6) flash devices in a stack, with each device having 16 KB (2^14) erase blocks. Each erase block, in turn, includes sixty-four flash pages, each with 256 (2^8) 64B cache lines. The six byte-address bits are not used. Finally, the DRAM addressing accommodates up to eight (2^3) DRAM devices in a stack, with each device having sixteen (2^4) banks. Each DRAM bank, in turn, includes 64K (2^16) rows, each with 128 (2^7) 64B cache lines. The five most-significant bits AD[35:31] distinguish the thirty-two sets Set[31:0] depicted in FIG. 4A.

Figure 4C:
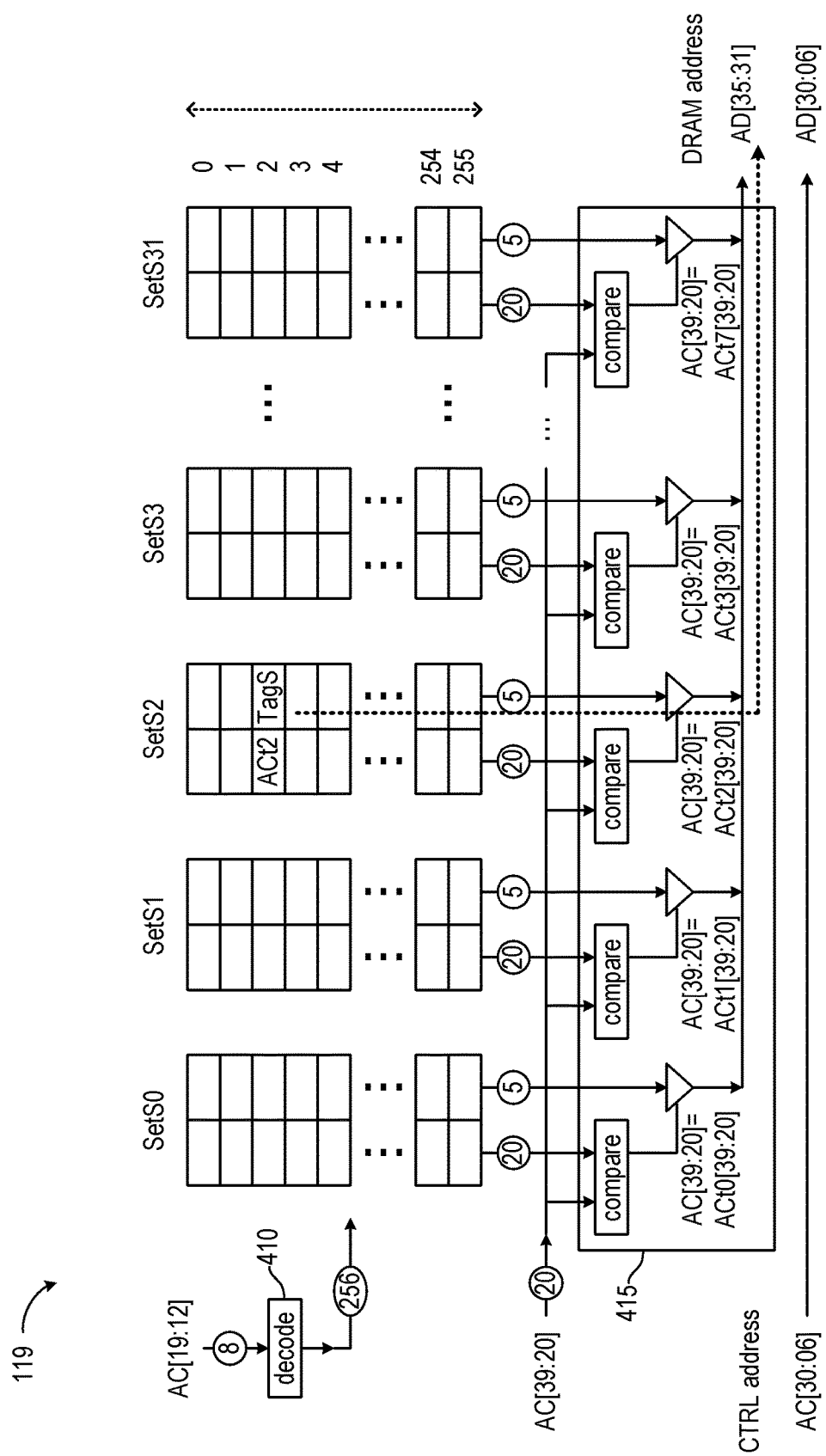
FIG. 4C illustrates the organization of an embodiment of SRAM address cache 119.

FIG. 4C illustrates the organization of an embodiment of SRAM address cache 119. Like DRAM cache 330, SRAM address cache 119 is divided into thirty-two sets SetS[31:0]. Each set includes 256 tag locations, each of which in turn includes a twenty-bit index field ACtS and five-bit tag field TagS for a total of 204,800 bits. A decoder 410 decodes controller address bits AC[19:12] to select one row of tag locations. Logic 415 compares high-order address bits AC[39:20] with the index fields for the selected row in all thirty-two sets. In case of a match, SRAM address cache 119 conveys the contents of the five-bit tag field TagS of the selected row and set as DRAM address bits AD[35:31] to select the set within DRAM cache 330 that includes the requested data. In this example controller address bits AC[39:20] match the third row of set SetS2, which consequently delivered its five-bit tag TagS. Address bits AC[30:6] are passed unaltered as DRAM address bits AD[30:6] to select the cache line within the selected DRAM set.

Figure 5:
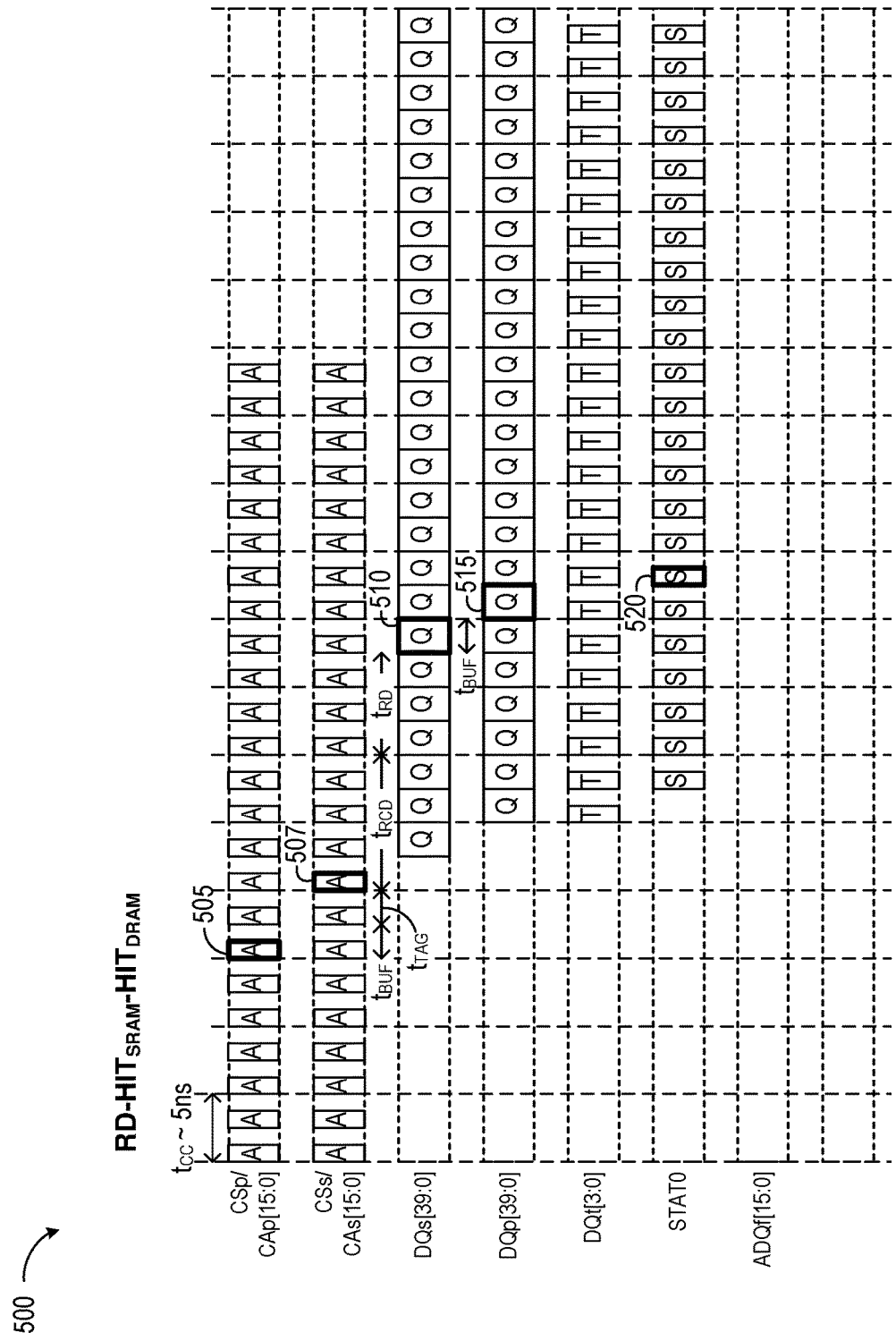
FIG. 5 is a timing diagram 500 illustrating a read access to module half 115(0) when the requested cache line is in DRAM memory 330 and the address of that cache line is available in SRAM address cache 119.

FIG. 5 is a timing diagram 500 illustrating a read access to module half 115(0) when the requested cache line is in DRAM memory 330 and the address of that cache line is available in SRAM address cache 119. FIG. 5 and subsequent timing diagrams refer to signals and signal lines introduced in FIG. 3. In general, signals and their associated nodes carry the same designations. Whether a given moniker refers to a signal or a corresponding node will be clear from the context.

A read transaction begins when external controller 110 issues a read request over primary links CSp/CAp specifying a controller address AC[39:6] (505). Signals involved in this sample transaction are highlighted with bold boundaries to distinguish them from interleaved transactions. Transaction pipelining increases memory throughput.

Address buffer 118(0) conveys address bits AC[39:12] to SRAM address cache 119, which considers bits AC[39:20] over a time tTAG to determine whether the requested data is in DRAM cache 330. Should a match arise, SRAM cache 119 delivers high-order DRAM address bits AD[35:31] to address-mapping logic 310, which concatenates these with controller address bits AC[30:6] to form the DRAM address AD[35:6] of the requested 64B cache line (507). DRAM address bits AD[35:31] designate the set Set[i] of the requested cache line in DRAM cache 330 and controller address bits AC[30:6] the offset within designated set Set[i].

DRAM memory space 330 responsively delivers the addressed data (510) over secondary data links DQs. That data line is then sent to controller 110 via primary links DQp with a buffer delay $t_{BUF}$ imposed by address buffer 118(0) (515). Address buffer 118(0) instructs status logic 320 to issue a SRAM-hit signal 520 to status register 328 to let controller 110 know that the delivered read data is the requested data. Module 115 thus returns the requested 64B cache line in about 30 ns from receipt of request 505. Thus ends the read transaction in which SRAM address cache 119 yields a hit. Though not shown, address buffer 118(0) can consider parity and EDC bits for error detection and correction. The use of parity and EDC bits is well understood by those of skill in the art.

Figure 6:
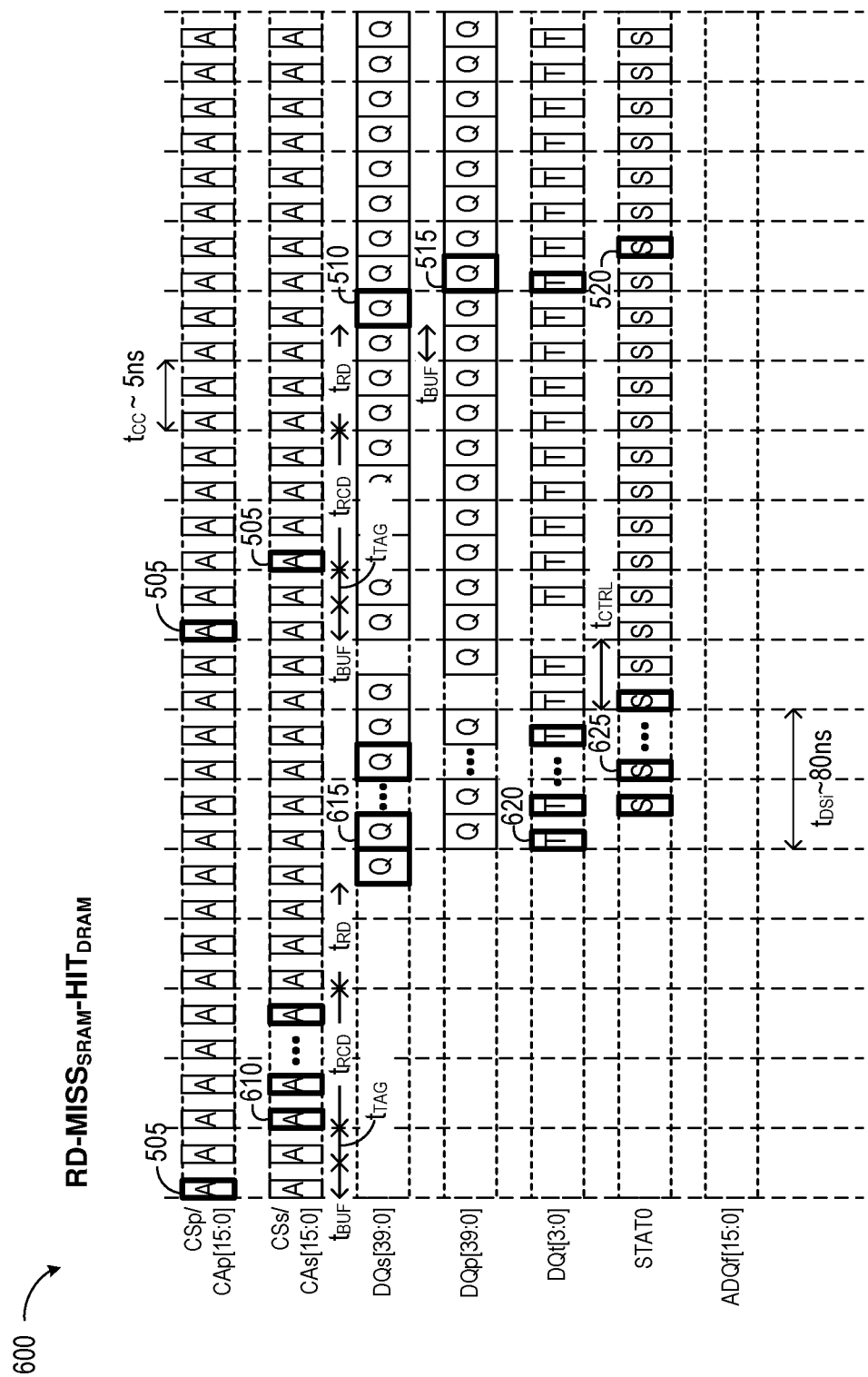
FIG. 6 is a timing diagram 600 illustrating a read access to module half 115(0) when the requested cache line is in DRAM memory 330 and an address tag for that cache line is absent from SRAM address cache 119.

FIG. 6 is a timing diagram 600 illustrating a read access to module half 115(0) when the requested cache line is in DRAM memory 330 and an address tag for that cache line is absent from SRAM address cache 119. As in the example of FIG. 5, a read transaction begins when external controller 110 issues a read request over primary links CSp/CAp specifying a controller address AC[39:6] (505). This time, however, address bits AC[39:20] have no match in SRAM address cache 119. Address buffer 118(0) thus attempts to find the requested cache line entry in DRAM cache 330. To do so, address-mapping logic 310 issues thirty-two successive read requests 610 to DRAM cache 330, one request for each set Set[31:0], by incrementing through each value of AD[35:31] with offset AC[30:6]. Each read request returns a cache line 615 with a DRAM tag 620, the latter of which is conveyed to address-mapping logic 310 via connection Qt. Address buffer 118(0) instructs status logic 320 to issue a miss signal 625 to status register 328 for each of these reads so that controller 110 ignores these read data. For the final DRAM miss, the miss signal 625 can indicate to controller 110 the need for a flash access.

DRAM memory 330 can be organized such that each read in the sequence of thirty-two reads is directed to a successive bank so that each bank has time to complete a row cycle before the subsequent access. In this example, read data 615 first appears after a 10 ns row-to-column read delay $t_{RCD}$ and 15 ns read delay $t_{RD}$. Accesses are pipelined such that each additional cache line requires an additional 2.5 ns. All thirty-two reads are therefore accomplished over a time tips, of 80 ns. DRAM read accesses can be halted responsive to a tag hit, so the average time tips, will be closer to 40 ns for a DRAM cache hit.

Should one of the thirty-two tags 620 match address bits AC[39:20]—a DRAM cache hit—then address buffer 118(0) updates SRAM address cache 119 with the address and tag information for the requested cache line. The updated set and line in SRAM address cache 119 can be selected at random, thought other replacement policies might be used. A retry of request 505 from controller 110 will then result in a SRAM cache hit and the delivery of the requested cache line in the manner detailed in connection with FIG. 5. In other embodiments the requested cache line is retained in address buffer 118(0) to hasten cache line delivery responsive to the retry. Module 115 returns the requested 64B cache line in about 150 ns from receipt of the first instance of request 505. Other transactions can be pipelined between the first instance of request 505 and the retry to take advantage of available data bandwidth. Thus ends the read transaction in which SRAM address cache 119 yields a miss and DRAM cache 330 a hit.

Figure 7:
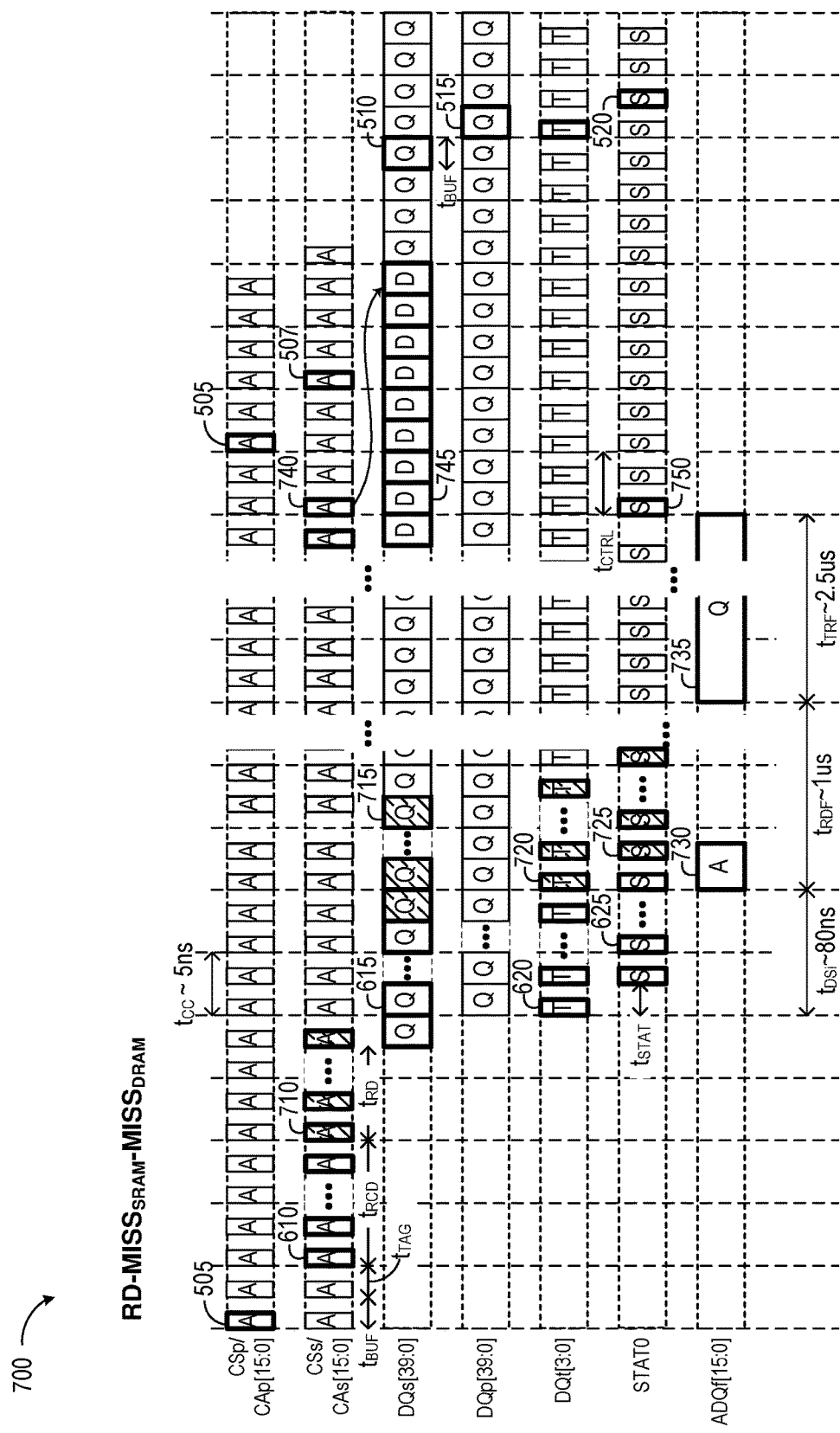
FIG. 7 is a timing diagram 700 illustrating a read access to module half 115(0) when the requested cache line is absent DRAM memory 330 and the address of that cache line is absent from SRAM address cache 119.

FIG. 7 is a timing diagram 700 illustrating a read access to module half 115(0) when the requested cache line is absent DRAM memory 330 and the address of that cache line is absent from SRAM address cache 119. This presents the worst case from a read-latency perspective because a relatively large 4 KB group 333 of data is moved from the relatively slow flash address space 335 into DRAM cache 330, a process that takes about 3.5 us.

Address buffer 118(0) chooses a clean entry in DRAM cache 330. To do so, address-mapping logic 310 issues thirty-two successive read requests 710 to DRAM cache 330, one request for each set Set[31:0], by incrementing through each value of AD[35:31] with offset by bits AC[30:12] of the original request 505 and bits AC[11:6]=000000b. Each read request returns a cache line 715 with a DRAM dirty bit 720, the latter of which is conveyed to address-mapping logic 310 via connection Qt. Address buffer 118(0) instructs status logic 320 to issue a miss signal 725 to status register 328 for each of these reads so that controller 110 ignores these read data, and considers dirty bits 720 to identify a clean 4 KB group (i.e., a 4 KB group 332 without any overwritten cache lines) to be evicted in favor of a new 4 KB group 333 from flash address space 335. As noted previously, the first cache line of each 4 KB group 332 with at least one dirty cache line is tagged "dirty" using data accumulated in buffer 315 during cache line writes.

While searching for a clean 4 KB group 332, address buffer 118(0) conveys the flash address 730 of the requested data to flash address space 335 over bus ADQf[15:0]. After a flash-read delay $t_{RDF}$, address buffer 118(0) receives the requested 4 KB block 735 from flash address space 335 over a time period $t_{TRF}$, updates SRAM address cache 119. Using a series of local write commands 740, address buffer 118(0) writes the 4 KB block 735 to DRAM memory 330 as a series of data 745 on local data buses DQs[39:0] and conveys a status signal 750 to controller 110 to instigate a retry for the requested cache line. Thereafter a retry of request 505 from controller 110 will result in an SRAM cache hit and the delivery of the requested cache line will proceed as noted previously. In some embodiments, address buffer 118(0) allows a retry from controller 110 when the requested cache line is available and before the entire 4 KB block is cached in DRAM memory 330. If flash address space 335 allows reordering of read data, the requested cache line can be provided first with the conveyance of all sixty-four cache lines of a 4 KB group.

Address buffer 118(0) can maintain a counter (not shown) recording the number of clean 4 KB blocks 332 in DRAM cache 330. Should the number fall below a threshold, one or more of the 4 KB blocks 332 may be overwritten by a block 333 from flash address space 335. Such write-back processes can be scheduled to take place during idle periods.

Figure 8:
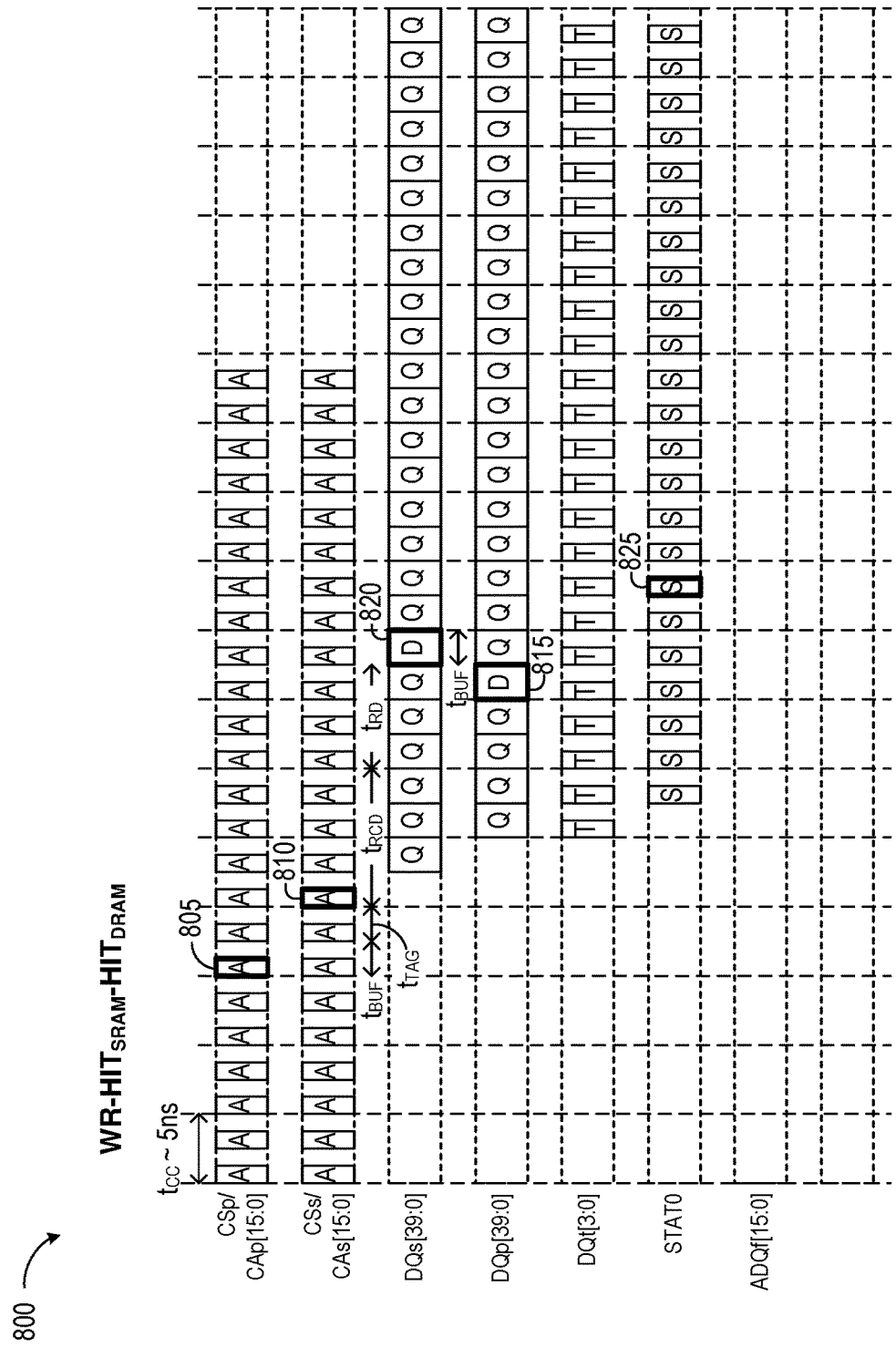
FIG. 8 is a timing diagram 800 illustrating a write access to module half 115(0) when the requested cache line is in DRAM memory 330 and the address of that cache line is available in SRAM address cache 119.

FIG. 8 is a timing diagram 800 illustrating a write access to module half 115(0) when the requested cache line is in DRAM memory 330 and the address of that cache line is available in SRAM address cache 119. A write transaction begins when external controller 110 issues a write request 805 over primary links CSp/CAp specifying a controller address AC[39:6]. Address buffer 118(0) conveys address bits AC[39:12] to SRAM address cache 119, which considers bits AC[39:20] over time tTAG to determine whether the requested data is in DRAM cache 330. Should a match arise, SRAM address cache 119 delivers high-order DRAM address bits AD[35:31] to address-mapping logic 310, which concatenates these with controller address bits AC[30:6] to form the DRAM address AD[35:6] of the requested 64B cache line. DRAM address bits AD[35:31] designate the set and controller address bits AC[30:6] the offset within the set of the requested cache line. Accesses are fully pipelined.

Controller 110 conveys write data 815 timed to request 805 on primary data lines DQp[39:0]. Address buffer 118(0) responsively conveys the write data with valid and dirty bits (820) to DRAM memory space 330 via secondary data line DQs[39:0] after a buffer delay $t_{BUF}$. If supported, address buffer 118(0) additionally calculates parity and EDC bits for storage with the write data. Address logic 210 updates buffer 315 to include address bits AD[35:12] of the 4 KB group associated with the dirty cache line in DRAM cache 330. As noted previously, this information supports a block eviction process for loading blocks from flash address space 335 to DRAM cache 330. Address buffer 118(0) instructs status logic 320 to issue a SRAM-hit signal 825 to status register 328 to report the successful write to controller 110.

While the subject matter has been described in connection with specific embodiments, other embodiments are also envisioned. Other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A memory module comprising:
  a nonvolatile memory component defining a nonvolatile address space, the nonvolatile address space to store data at nonvolatile-memory addresses;
  volatile memory components defining a volatile address space, the volatile address space to cache the data stored in the nonvolatile address space with first address tags corresponding to the nonvolatile-memory addresses of the data; and
  an address buffer component to cache second address tags corresponding to the data cached in the volatile address space.

2. The memory module of claim 1, wherein the volatile address space is divided into sets of volatile addresses, each set to store blocks of the data, each block to store cache lines of the data.

3. The memory module of claim 2, wherein the volatile address space further comprises write-back buffer space, the address buffer component to aggregate dirty ones of the cache lines into the write-back buffer space.

4. The memory module of claim 2, each of the second address tags corresponding to one of the blocks of the data.

5. The memory module of claim 1, wherein the address buffer component comprises static, random-access memory to cache the second address tags.

6. The memory module of claim 1, further comprising address logic to access the volatile memory components responsive to a first access request to a first address while the address buffer component evaluates a second access request to a second address.

7. The memory module of claim 1, the volatile memory components to cache the data in cache lines, each cache line having storage for one of the first address tags and at least one of a dirty bit and a valid bit.

8. The memory module of claim 1, wherein the first address tags are of a first number of address bits and the second address tags are of second number of address bits fewer than the first number of address bits.

9. The memory module of claim 1, wherein the data stored in the volatile address space is stored in cache lines; and each of the second address tags specifies a block of a plurality of the cache lines.

10. The memory module of claim 1, wherein the address buffer aggregates dirty bits before writing the dirty bits to the volatile memory components.

11. The memory module of claim 1, wherein the address buffer moves cache lines of the data, including a requested one of the cache lines of the data, from the nonvolatile-memory addresses to the volatile memory components, and wherein the nonvolatile memory component reorders the cache lines to advance provision of the requested one of the cache lines.

12. The memory module of claim 1, the volatile memory components storing cache lines in the volatile address space, the address buffer further comprising a dirty-group buffer to store write addresses for groups of the cache lines.

13. The memory module of claim 12, the address buffer to store a dirty bit in the dirty-group buffer for a cache miss to the address buffer component.

14. The memory module of claim 13, the address buffer to write the dirty bit from the dirty-group buffer to one of the cache lines of the volatile memory components, the one of the cache lines one of multiple cache lines in one of the groups.

15. The memory module of claim 14, wherein the address buffer examines the dirty bit to evict the cache lines in a clean group.

16. The memory module of claim 2, wherein the volatile address space is divided into a number of the sets of volatile addresses, and wherein the number of the sets can be adjusted in increments of one set.

17. A method for caching data from a nonvolatile memory component, the data organized as cache lines stored at nonvolatile-memory addresses, the method comprising:
  copying the cache lines from the nonvolatile-memory addresses to volatile-memory addresses in a first random-access memory component;
  storing, in the first random-access memory component, a first address tag with each of the cache lines copied to one of the volatile-memory addresses in the first random-access memory component; and
  caching, in a second random-access memory component, a second address tag corresponding to a subset of the cache lines stored in the volatile-memory addresses in the first random-access memory component.

18. The method of claim 17, wherein the first random-access memory component comprises dynamic random-access memory and the second random-access memory component comprises static random-access memory.

19. The method of claim 17, wherein the nonvolatile memory component comprises flash memory.

* * * * *